United States Patent
Rahman

(10) Patent No.: US 11,558,730 B1
(45) Date of Patent: Jan. 17, 2023

(54) PROVIDING USER EQUIPMENT (UE) LOCATION INFORMATION DURING AN EMERGENCY CALL

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/320,177

(22) Filed: May 13, 2021

(51) Int. Cl.
| | |
|---|---|
| *H04W 4/90* | (2018.01) |
| *H04W 4/029* | (2018.01) |
| *G01S 19/46* | (2010.01) |
| *H04W 24/08* | (2009.01) |
| *H04W 64/00* | (2009.01) |

(52) U.S. Cl.
CPC .............. *H04W 4/90* (2018.02); *G01S 19/46* (2013.01); *H04W 4/029* (2018.02); *H04W 24/08* (2013.01); *H04W 64/006* (2013.01)

(58) Field of Classification Search
CPC ....................................................... H04W 4/90
See application file for complete search history.

(56) References Cited

U.S. PATENT DOCUMENTS

| | | | |
|---|---|---|---|
| 2016/0029197 A1* | 1/2016 | Gellens | H04L 65/65 455/404.1 |
| 2016/0105784 A1* | 4/2016 | Gellens | H04M 3/5116 455/404.1 |
| 2017/0245318 A1* | 8/2017 | Rayavarapu | H04W 76/27 |

* cited by examiner

*Primary Examiner* — Qutbuddin Ghulamali

(57) ABSTRACT

A solution for providing user equipment (UE) location information during an emergency call (e.g., an E911 call) includes: detecting an emergency call originating from the UE; determining a location of the UE; based on at least detecting the emergency call originating from the UE, transmitting the location of the UE across a cellular network to an emergency monitoring node (e.g., a public safety answering points (PSAP) and/or a gateway mobile location center (GMLC)); and based on at least detecting the emergency call originating from the UE, transmitting the location of the UE across a packet data network (e.g., the internet, using a data plan) to the emergency monitoring node. This provides an alternate path for the location information, and some examples use a larger set of location information sources. In some examples, during the emergency call, based on available battery power, the UE location information may be updated.

19 Claims, 5 Drawing Sheets

US 11,558,730 B1

PROVIDING USER EQUIPMENT (UE) LOCATION INFORMATION DURING AN EMERGENCY CALL

BACKGROUND

When someone requires assistance, and places an emergency phone call, it is often important for emergency responders to know the location of that person. A cellular device, for example a user equipment (UE), has logic to determine and automatically report its location over the cellular network to which it is connected, when making an emergency call, such as an enhanced 911 (E911) call. The UE may use a global positioning system (GPS) receiver or assisted GPS (AGPS) to determine its location. The location of the UE is routed to a public safety answering point (PSAP), where the emergency call is answered, and the person using the UE may make a report on the emergency.

Unfortunately, if there is problem with the process of the UE determining its location from traditional sources, or transmitting the information on the cellular network, the PSAP will not receive the correct, accurate UE location information in a timely manner.

SUMMARY

The following summary is provided to illustrate examples disclosed herein, but is not meant to limit all examples to any particular configuration or sequence of operations.

A solution for providing user equipment (UE) location information during an emergency call (e.g., an E911 call) includes: detecting an emergency call originating from the UE; determining a location of the UE; based on at least detecting the emergency call originating from the UE, transmitting the location of the UE across a cellular network to an emergency monitoring node (e.g., a public safety answering points (PSAP) and/or a gateway mobile location center (GMLC)); and based on at least detecting the emergency call originating from the UE, transmitting the location of the UE across a packet data network (e.g., the internet, using a data plan) to the emergency monitoring node. This provides an alternate path for the location information, and some examples use a larger set of location information sources. In some examples, during the emergency call, based on available battery power, the UE location information may be updated. User permission is obtained, as necessary, and other relevant information may also be provided.

BRIEF DESCRIPTION OF THE DRAWINGS

The disclosed examples are described below with reference to the accompanying drawing figures listed below, wherein.

Figure 1:
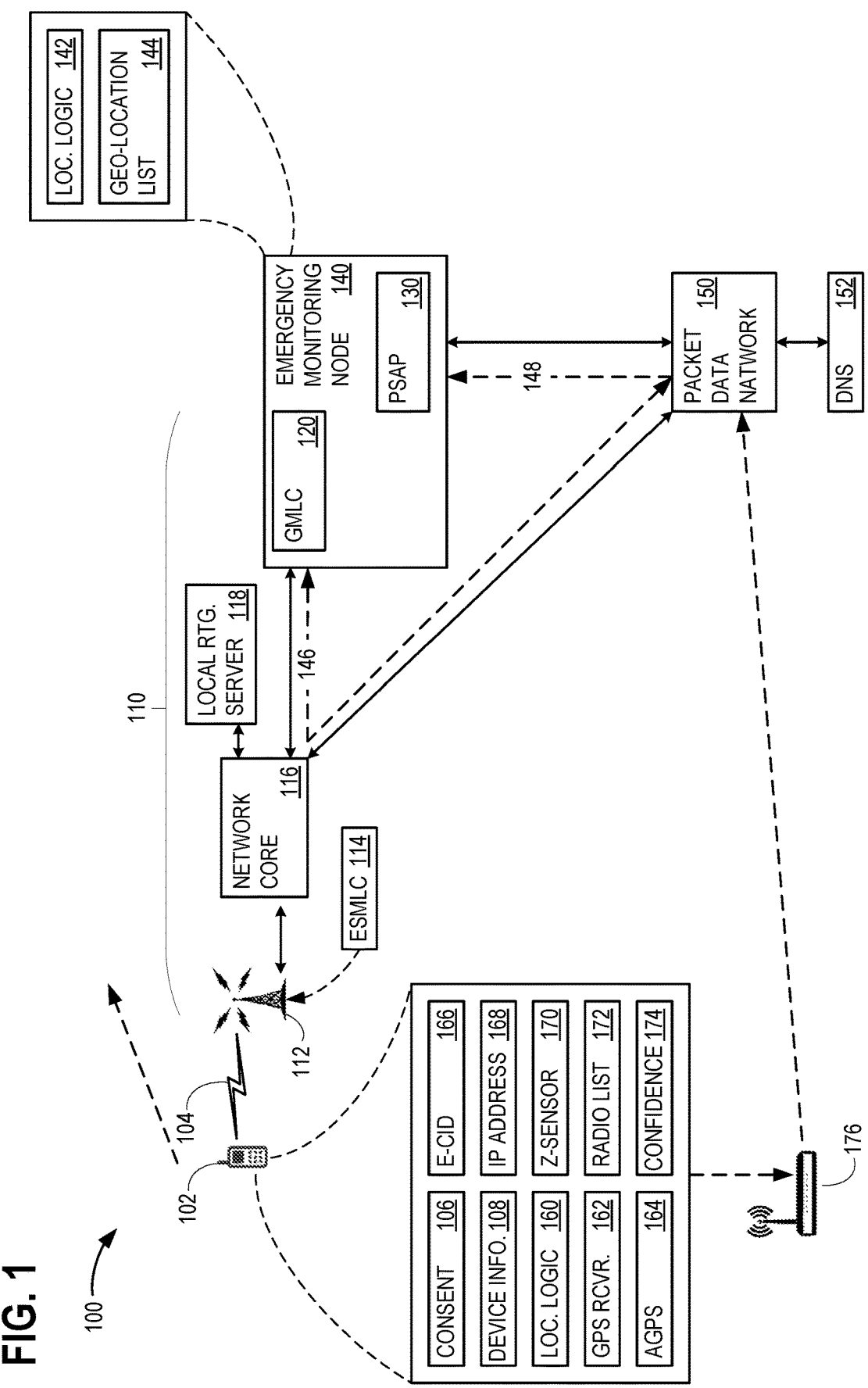
FIG. 1 illustrates an exemplary arrangement that advantageously provides user equipment (UE) location information during an emergency call.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

A solution for providing user equipment (UE) location information during an emergency call (e.g., an enhanced 911 (E911) call) includes: detecting an emergency call originating from the UE; determining a location of the UE; based on at least detecting the emergency call originating from the UE, transmitting the location of the UE across a cellular network to an emergency monitoring node (e.g., a public safety answering points (PSAP) and/or a gateway mobile location center (GMLC)); and based on at least detecting the emergency call originating from the UE, transmitting the location of the UE across a packet data network (e.g., the internet, using a data plan) to the emergency monitoring node. This provides an alternate path for the location information, and some examples use a larger set of location information sources. In some examples, during the emergency call, based on available battery power, the UE location information may be updated. User permission is obtained, as necessary, and other relevant information may also be provided.

Aspects of the disclosure improve the reliability of emergency calls placed over cellular networks, and therefore improve public safety, by providing an alternate parallel route for UE location information to the emergency monitoring node. For example, the UE transmits its location, across a cellular network and also across a packet data network, to an emergency monitoring node. In some examples, the UE uses supplemental location information, in addition to the primary location data source, to further improve reliability.

With reference now to the figures, FIG. 1 illustrates an arrangement 100 that provides location information for UE 102 during an emergency call through a cellular network 110 (e.g., an enhanced 911 (E911) call). UE 102 communicates with a serving base station 112 over an air interface 104. Serving base station 112 is part of cellular network 110 and hosts an evolved serving mobile location center (eSMLC) 114 that calculates network-based location estimates of mobile stations, such as UE 102. Cellular network 110 also includes a network core 116, a local routing server 118, and a GMLC 120 that holds UE position information for other network elements and external elements, such as PSAP 130.

PSAP 130 is an emergency call answering center which receives the emergency call from UE 102, and at which the operators need location information for UE 102 in order to dispatch emergency services. In some examples, PSAP 130 obtains location information for UE 102 from GMLC 120, for example the location information for UE 102 that is sent over cellular network 110. In some examples, UE 102 obtains identification of PSAP 130 (e.g., the local PSAP, rather than a PSAP located elsewhere) from local routing server 118, and reaches PSAP 130 using an emergency service routing key (ESRK) number. An ESRK number is used for routing an E911 call to the appropriate PSAP. In some examples, an emergency services routing digit (ESRD) identifies the cell site and sector of the call origination in a wireless call scenario. The ESRD and ESRK define a route to the proper PSAP. The ESRK and/or the ESRD may be signaled to PSAP 130 for use in identifying the emergency service agencies (e.g., police, fire, medical) associated with the location of UE 102. GMLC 120 and PSAP 130 are referred to collectively as emergency monitoring node 140, because UE 102 may send its location information to PSAP 130 directly and/or send its location information to GMLC 120, from which PSAP 130 retrieves the location information.

UE 102 is connected to both cellular network 110 and a packet data network 150 (e.g., the internet). UE 102 may connect to packet data network 150 through a portion of cellular network 110, using a data plan, and/or may connect to packet data network 150 using another route, such as a WiFi router 176. This pair of connections provides dual pathways for UE 102 to pass location information to emergency monitoring node 140 (e.g. to GMLC 120 and/or PSAP 130). A pathway 146 passes from UE 102, through cellular network 110, to emergency monitoring node 140. A pathway 148 passes from UE 102, through either a portion of cellular network 110 or WiFi router 176, through packet data network 150, to emergency monitoring node 140. Several components are used on UE 102 and within emergency monitoring node 140 (e.g., residing within GMLC 120 and/or PSAP 130) to leverage using both pathway 146 and pathway 148 to communication location information for UE 102 to emergency monitoring node 140. UE 102 holds a user consent record 106 that records consent of the user of UE 102 to provide location information, and other relevant device identification information 108 (e.g. operating system (OS), model number, manufacturer), to emergency monitoring node 140 across packet data network 150.

A location logic 160 may be implemented as standard E-911 location reporting capability, plus an additional application (app), or as a single logic component. Location logic 160 determines the location of UE 102 using primary sources and secondary sources. Primary sources may include a global positioning system (GPS) receiver 162, assisted GPS (AGPS) 164, and an enhanced cell identification (E-CID) 166. E-CID is a positioning feature that reports serving base station 112 of UE 102 and a timing advance (difference between its transmit and receive time). Secondary sources may include an internet protocol (IP) address 168, an atmospheric z-axis sensor 170 (e.g., an air pressure sensor), and identification of a nearby base station (e.g., WiFi router 176) other than serving base station 112. IP address 168 may be assigned to UE 102 by a domain name server (DNS) 152, to enable UE 102 to communicate over packet data network 150. In general, IP addresses have some degree of regionality, enabling them to be used for some geographical estimation tasks. A geo-location list 144 in emergency monitoring node 140 may thus be able to correlate IP address 168 with an approximate geographical region.

A detected radio list 172 identifies base stations for which signals are received by UE 102, indicating that UE 102 is nearby such base stations. When UE 102 is sufficiently nearby (and UE 102 has its WiFi transceiver enabled), detected radio list 172 will indicate WiFi router 176. In some scenarios, geo-location information for WiFi router 176 may have been previously collected (e.g., by cellular network 110) and so may be available in geo-location list 144 in emergency monitoring node 140.

In some examples, location logic 160 also calculates (determines) a confidence factor 174 for the location of UE 102. Confidence factor 174 may be reported to emergency monitoring node 140 along with the location information for UE 102, in order to indicate to operators at PSAP 130 how precise the location information is. Since AGPS 164 may take approximately 20 seconds, and be reported after other location data sources, confidence factor 174 may improve over time. This indicates that ongoing determination and reporting of location information may be helpful, for example on a 5 to 15 second interval (or other interval, as required or configured).

Emergency monitoring node 140 has its own location logic 142 that receives location information from UE 102 over both cellular network 110 and packet data network 150. In some examples, location logic 142 compares IP address 168 and/or an identification of WiFi router 176 (from detected radio list 172) with geo-location list 144, to obtain a location estimate for UE 102. In some examples, location logic 142 compares the determined location of UE 102 using location information received from cellular network 110 with the determined location of UE 102 using location information received from packet data network 150, and generates an alert for operators at PSAP 130 if the determined locations are sufficiently different (e.g., beyond some tolerance). Such a scenario indicates that one or both of the locations provided for UE 102, over different pathways 146 and 148, may be unreliable.

Figure 2:
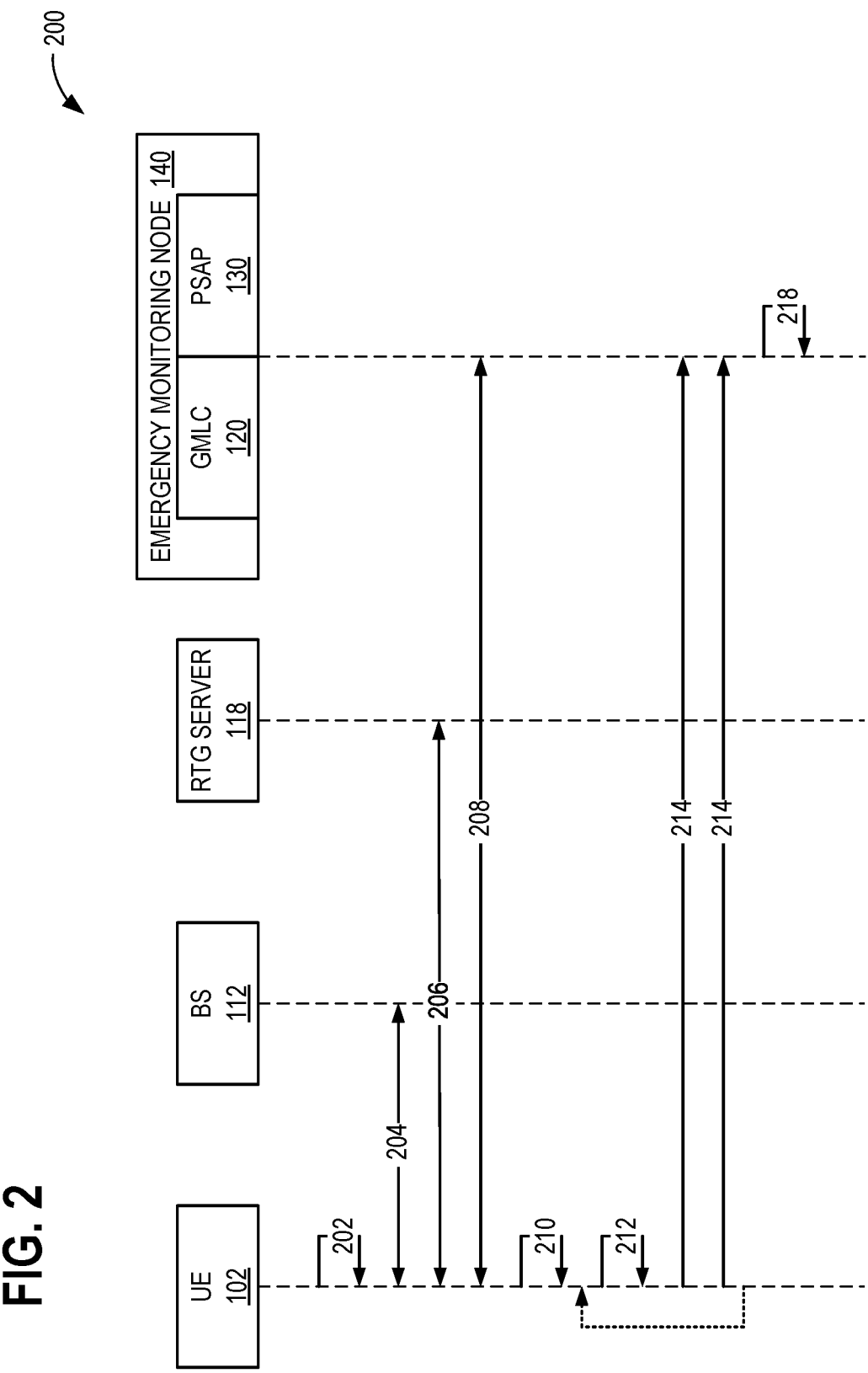
FIG. 2 illustrates an exemplary message sequence diagram associated with providing UE location information during an emergency call, as may occur in the arrangement of FIG. 1.
Figure 3:
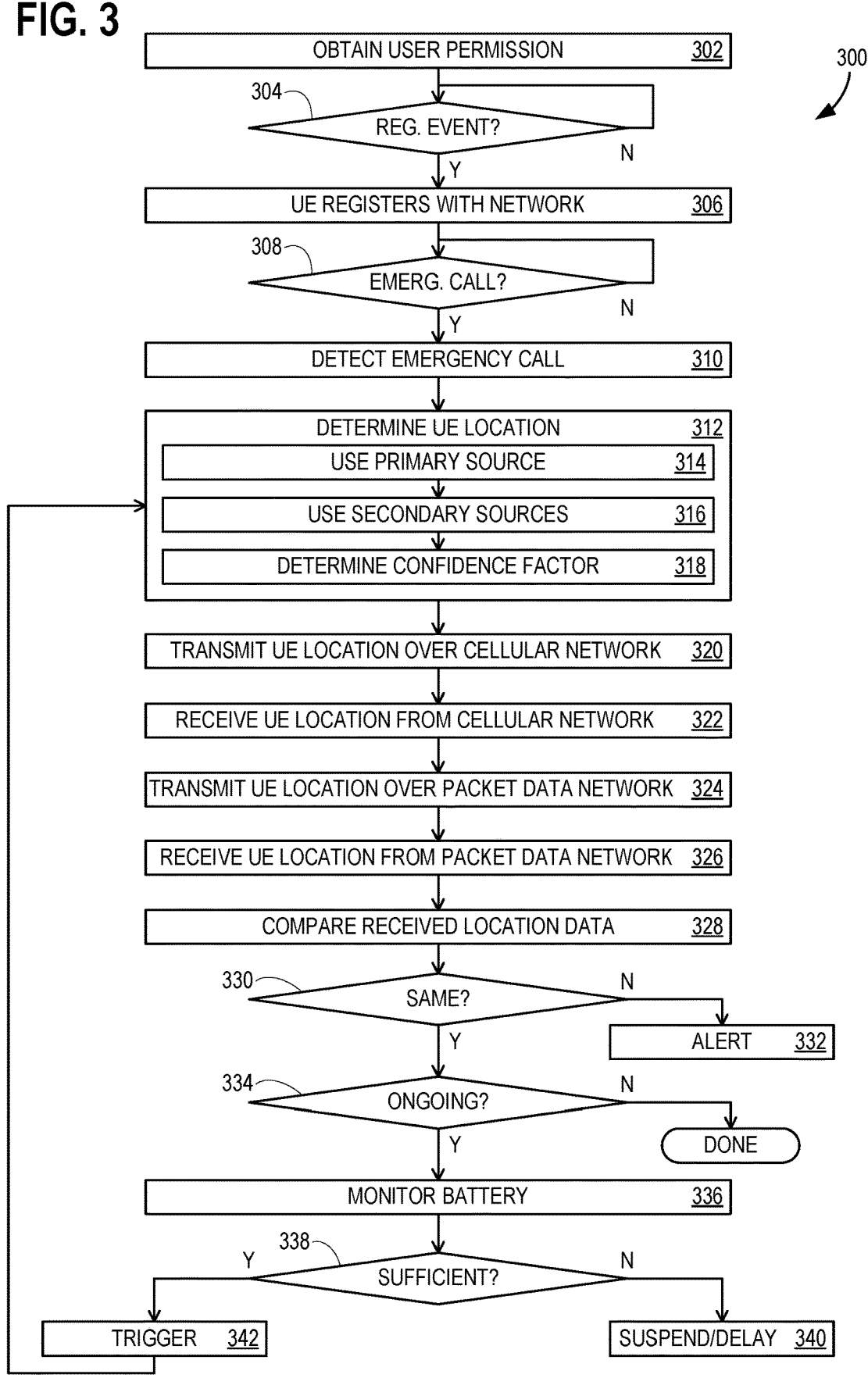
FIG. 3 illustrates a flowchart of exemplary operations associated with providing UE location information during an emergency call, using the arrangement of FIG. 1.

Further description of arrangement 100 is made with respect to the descriptions of FIGS. 2 and 3. FIG. 2 illustrates a message sequence diagram 200 and FIG. 3 illustrates a flowchart 300 of exemplary wireless communication operations, both associated with examples of arrangement 100. In some examples, at least a portion of flowchart 300 may be performed using one or more computing devices 500 of FIG. 5. FIGS. 1, 2 and 3 should be viewed together.

Location logic 160 obtains user permission (stored as user consent record 106) for transmitting the location of UE 102 across packet data network 150, as operation 302, and indicated as message 202. A decision operation 304 determines whether there has been a network registration event, such as cell handover or UE 102 powers up. If so, UE 102 registers with serving base station 112 in operation 306, which uses message 204 between UE 102 and serving base station 112. Also, as part of operation 306, UE 102 may register with local routing server 118, using message 206 between UE 102 and local routing server 118. This informs UE 102 of the identity of PSAP 130. If an emergency call is made by UE 102, as indicated by decision operation 308 and shown as message 208, location logic 160 detects the emergency call originating from UE 102 in operation 310, also shown as message 210. In some examples, the emergency call comprises an E911 call.

Location information (e.g., the actual location and/or other information from which the location may be derived) is determined for UE 102 in operation 312, also shown as message 212. In some examples, operation 312 is performed in three parts: operations 314-318. Operation 314 includes determining location information for UE 102 from a primary location data source. In some examples, the primary location data source comprises a data source selected from the list consisting of: GPS receiver 162, AGPS 164, and an identification of serving base station 112 (e.g. the base station serving UE 102). Operation 316 includes determining supplemental location information for UE 102 from one or more secondary location data sources. In some examples, the secondary location data source comprises a data source selected from the list consisting of: IP address 168 (of UE 102), atmospheric z-axis sensor 170, and identification of WiFi router 176 (a nearby base station other than serving base station 112). Operation 318 includes, based on at least the supplemental location information for UE 102, determining confidence factor 174 for the location of UE 102.

Operation 320 includes, based on at least detecting the emergency call originating from UE 102, transmitting the location of UE 102 across cellular network 110 to emergency monitoring node 140. This is also shown as message 214. In some examples, emergency monitoring node 140 comprises PSAP 130 and/or GMLC 120. Operation 322 includes receiving, at emergency monitoring node 140, the location of UE 102 from cellular network 110. Operation 324 includes based on at least detecting the emergency call originating from UE 102, transmitting the location of UE 102 across packet data network 150 to emergency monitoring node 140. This is also shown as message 216.

In some examples, operation 324 (and thus message 216) further includes transmitting confidence factor 174 for the location of UE 102 across packet data network 150 to emergency monitoring node 140. In some examples, operation 324 (and thus message 216) further includes, based on at least detecting the emergency call originating from UE 102, transmitting device identification information 108 across packet data network 150 to emergency monitoring node 140. In some examples, device identification information 108 comprises a data item selected from the list consisting of: an OS identification, a model identification of UE 102, and a source identification (e.g., manufacturer) of UE 102. Operation 326 includes receiving, at emergency monitoring node 140, the location of UE 102 from packet data network 150.

Operation 328 includes comparing the location of UE 102 received from cellular network 110 with the location of UE 102 received from packet data network 150. This is also shown as message 218. Decision operation 330 determines whether the locations are the same, within tolerances. If not, operation 332 includes, based on at least the location of UE 102 received from cellular network 110 differing from the location of UE 102 received from packet data network 150, generating an alert.

Otherwise, decision operation 334 determines whether the emergency call is ongoing or else has terminated. If the emergency call has terminated, flowchart 300 is done. If the emergency call remains ongoing, operation 336 includes monitoring a battery level of UE 102. This is to prevent further reporting of the location of UE 102 across packet data network 150 from draining a low battery during an emergency call, risking the possibility that UE 102 will cease functioning at a critical time. If a decision operation 338 determines that insufficient battery power remains for iterating operations 312-342 while the emergency call remains ongoing, then operation 340 includes, based on at least the battery level of UE 102, suspending or delaying the transmitting of the location of UE 102 across packet data network 150 to emergency monitoring node 140.

If sufficient battery power does remain, operation 342 waits for a trigger condition, such as the lapse of a timer (e.g., a 5 to 15 second timer, or other time). Upon the trigger condition, operations 312-342 are iterated while the emergency call remains ongoing. In some examples, the trigger condition comprises a timer event. Flowchart 300 then returns to operation 312. During a subsequent pass, operation 324 includes, based on at least a time interval (e.g., the trigger event), transmitting the location of UE 102 across packet data network 150 to emergency monitoring node 140.

Figure 4:
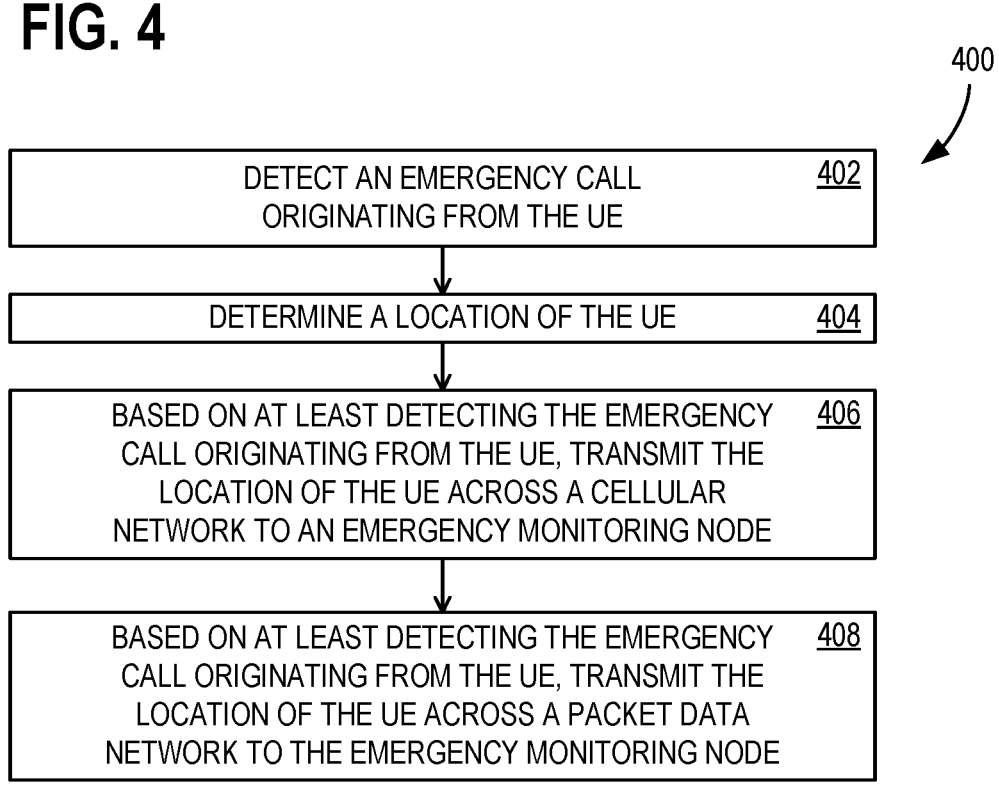
FIG. 4 illustrates another flowchart of exemplary operations associated with providing UE location information during an emergency call, using the arrangement of FIG. 1.

FIG. 4 illustrates a flowchart 400 of exemplary wireless communication operations associated with providing UE location information during an emergency call. In some examples, at least a portion of flowchart 400 may be performed using one or more computing devices 500 of FIG. 5. Operation 402 includes detecting an emergency call originating from the UE. Operation 404 includes determining a location of the UE. Operation 406 includes, based on at least detecting the emergency call originating from the UE, transmitting the location of the UE across a cellular network to an emergency monitoring node. Operation 408 includes, based on at least detecting the emergency call originating from the UE, transmitting the location of the UE across a packet data network to the emergency monitoring node.

Figure 5:
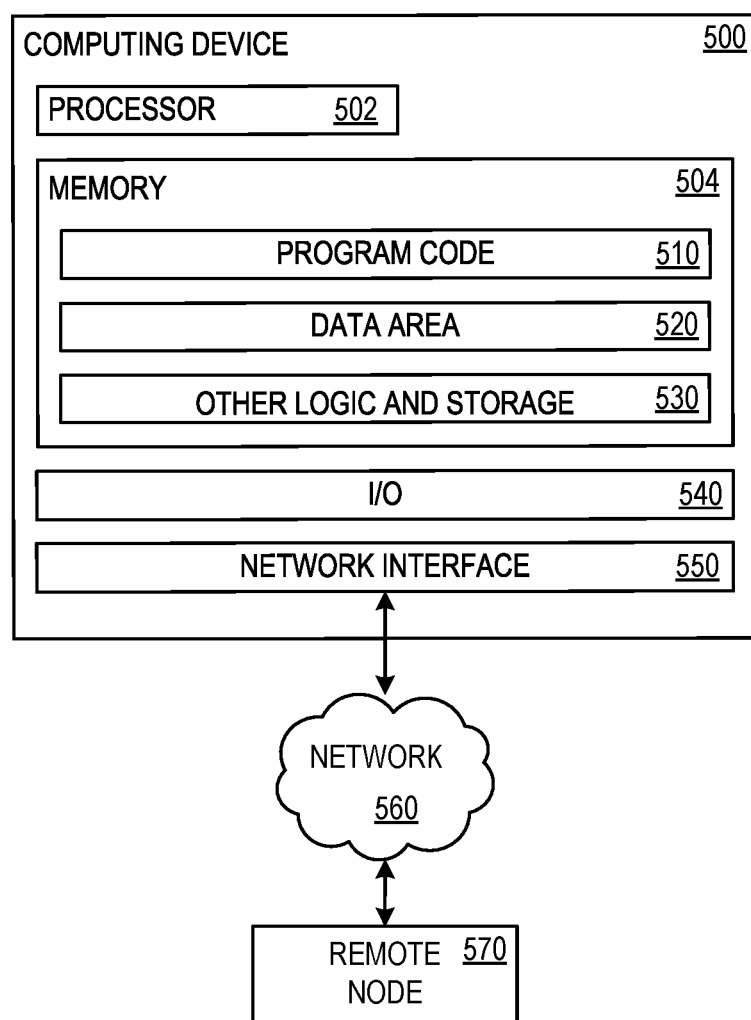
FIG. 5 illustrates a block diagram of a computing device suitable for implementing various aspects of the disclosure.

FIG. 5 illustrates a block diagram of computing device 500 that may be used as any component described herein that may require computational or storage capacity. Computing device 500 has at least a processor 502 and a memory 504 that holds program code 510, data area 520, and other logic and storage 530. Memory 504 is any device allowing information, such as computer executable instructions and/or other data, to be stored and retrieved. For example, memory 504 may include one or more random access memory (RAM) modules, flash memory modules, hard disks, solid-state disks, persistent memory devices, and/or optical disks. Program code 510 comprises computer executable instructions and computer executable components including any instructions necessary to perform operations described herein. Data area 520 holds any data necessary to perform operations described herein. Memory 504 also includes other logic and storage 530 that performs or facilitates other functions disclosed herein or otherwise required of computing device 500. An input/output (I/O) component 540 facilitates receiving input from users and other devices and generating displays for users and outputs for other devices. A network interface 550 permits communication over a network 560 with a remote node 570, which may represent another implementation of computing device 500. For example, a remote node 570 may represent another of the above-noted nodes within arrangement 100.

ADDITIONAL EXAMPLES

An example method of providing UE location information during an emergency call comprises: detecting an emergency call originating from the UE; determining a location of the UE; based on at least detecting the emergency call originating from the UE, transmitting the location of the UE across a cellular network to an emergency monitoring node; and based on at least detecting the emergency call originating from the UE, transmitting the location of the UE across a packet data network to the emergency monitoring node.

An example system for providing UE location information during an emergency call comprises: a processor; and a computer-readable medium storing instructions that are operative upon execution by the processor to: detect an emergency call originating from the UE; determine a location of the UE; based on at least detecting the emergency call originating from the UE, transmit the location of the UE across a cellular network to an emergency monitoring node; and based on at least detecting the emergency call originating from the UE, transmit the location of the UE across a packet data network to the emergency monitoring node.

One or more example computer storage devices has computer-executable instructions stored thereon, which, upon execution by a computer, cause the computer to perform operations comprising: detecting an emergency call originating from a UE; determining a location of the UE; based on at least detecting the emergency call originating from the UE, transmitting the location of the UE across a cellular network to an emergency monitoring node; and based on at least detecting the emergency call originating from the UE, transmitting the location of the UE across a packet data network to the emergency monitoring node.

Alternatively, or in addition to the other examples described herein, examples include any combination of the following:

the emergency monitoring node comprises a PSAP and/or a GMLC;

receiving, at the emergency monitoring node, the location of the UE from the cellular network;

receiving, at the emergency monitoring node, the location of the UE from the packet data network;

comparing the location of the UE received from the cellular network with the location of the UE received from the packet data network;

based on at least the location of the UE received from the cellular network differing from the location of the UE received from the packet data network, generating an alert;

determining supplemental location information for the UE from a secondary location data source, wherein a primary location data source comprises a data source selected from the list consisting of: a GPS receiver, AGPS, and an identification of a serving base station of the UE;

the secondary location data source comprises a data source selected from the list consisting of: an IP address of the UE, an atmospheric z-axis sensor, and an identification of a nearby base station other than the serving base station;

based on at least the supplemental location information for the UE, determining a confidence factor for the location of the UE;

transmitting the confidence factor for the location of the UE across the packet data network to the emergency monitoring node;

during the emergency call, iteratively: determining the location of the UE; and based on at least a time interval, transmitting the location of the UE across the packet data network to the emergency monitoring node;

monitoring a battery level of the UE;

based on at least the battery level of the UE, suspending or delaying the transmitting of the location of the UE across the packet data network to the emergency monitoring node;

based on at least a trigger condition, transmitting, by the UE, a data packet to the emergency monitoring node across the packet data network;

obtaining a user permission for transmitting the location of the UE across the packet data network;

based on at least detecting the emergency call originating from the UE, transmitting device identification information across the packet data network to the emergency monitoring node;

the device information comprises a data item selected from the list consisting of: an OS identification, a model identification of the UE, and a source identification of the UE;

the emergency call comprises an E911 call; and the trigger condition comprises a timer event.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of providing user equipment (UE) location information during an emergency call, the method comprising:

detecting an emergency call originating from the UE;

determining a location of the UE, including obtaining primary location data from at least one of a global positioning system (GPS) receiver, assisted GPS (AGPS), and an identification of a serving base station of the UE, and determining supplemental location information from secondary sources selected from at least one of an IP address of the UE, an atmospheric z-axis sensor, and an identification of a nearby base station other than the serving base station; and based on the obtained primary location data and the determined supplemental location information transmitting the determined location of the UE across a cellular network and a packet data network to an emergency monitoring node.

2. The method of claim 1, wherein the emergency monitoring node comprises a public safety answering points (PSAP) and/or a gateway mobile location center (GMLC).

3. The method of claim 1, further comprising:

receiving, at the emergency monitoring node, the determined location of the UE from the cellular network;

receiving, at the emergency monitoring node, the determined location of the UE from the packet data network;

comparing the determined location of the UE received from the cellular network with the determined location of the UE received from the packet data network; and based on at least the determined location of the UE received from the cellular network differing from the determined location of the UE received from the packet data network, generating an alert.

4. The method of claim 1, further comprising:

based on at least detecting the emergency call originating from the UE, transmitting device identification information across the packet data network to the emergency monitoring node, wherein the device identification information includes at least one of an operating system (OS) identification of the UE, a model identification of the UE, and a source identification of the UE.

5. The method of claim 1, further comprising:
during the emergency call, iteratively:
  determining the location of the UE; and
  based on at least a time interval, transmitting the determined location of the UE across the packet data network to the emergency monitoring node.

6. The method of claim 5, further comprising:
monitoring a battery level of the UE; and
based on at least the battery level of the UE, suspending or delaying the transmitting of the determined location of the UE across the packet data network to the emergency monitoring node.

7. The method of claim 1, further comprising:
based on at least a trigger condition, transmitting, by the UE, a data packet to the emergency monitoring node across the packet data network.

8. A system for providing user equipment (UE) location information during an emergency call, the system comprising:
a processor; and
a computer-readable medium storing instructions that are operative upon execution by the processor to:
  detect an emergency call originating from the UE;
  determine a location of the UE, wherein determining the location includes obtaining primary location data from at least one of a global positioning system (GPS) receiver, assisted GPS (AGPS), and an identification of a serving base station of the UE, and determining supplemental location information from secondary sources selected from at least one of an IP address of the UE, an atmospheric z-axis sensor, and an identification of a nearby base station other than the serving base station;
  based on the obtained primary location data and the determined supplemental location information, transmit the location of the UE across a cellular network to an emergency monitoring node; and
  based on the obtained primary location data and the determined supplemental location information, transmit the location of the UE across a packet data network to the emergency monitoring node.

9. The system of claim 8, wherein the emergency monitoring node comprises a public safety answering points (PSAP) and/or a gateway mobile location center (GMLC).

10. The system of claim 8, wherein the operations are further operative to:
receive, at the emergency monitoring node, the location of the UE from the cellular network;
receive, at the emergency monitoring node, the location of the UE from the packet data network;
compare the location of the UE received from the cellular network with the location of the UE received from the packet data network; and
based on at least the location of the UE received from the cellular network differing from the location of the UE received from the packet data network, generate an alert.

11. The system of claim 8, wherein the operations are further operative to:
based on at least detecting the emergency call originating from the UE, transmit device identification information across the packet data network to the emergency monitoring node, wherein the device identification information includes at least one of an operating system (OS) identification of the UE, a model identification of the UE, and a source identification of the UE.

12. The system of claim 8, wherein the operations are further operative to:
during the emergency call, iteratively:
  determine the location of the UE; and
  based on at least a time interval, transmit the location of the UE across the packet data network to the emergency monitoring node.

13. The system of claim 12, wherein the operations are further operative to:
monitor a battery level of the UE; and
based on at least the battery level of the UE, suspend or delay the transmitting of the location of the UE across the packet data network to the emergency monitoring node.

14. The system of claim 8, wherein the operations are further operative to:
obtain a user permission for transmitting the location of the UE across the packet data network.

15. One or more computer storage devices having computer-executable instructions stored thereon, which, upon execution by a computer, cause the computer to perform operations comprising:
detecting an emergency call originating from a user equipment (UE);
determining a location of the UE, including obtaining primary location data from at least one of a global positioning system (GPS) receiver, assisted GPS (AGPS), and an identification of a serving base station of the UE, and determining supplemental location information from secondary sources selected from at least one of an IP address of the UE, an atmospheric z-axis sensor, and an identification of a nearby base station other than the serving base station;
based on the obtained primary location data and the determined supplemental location information, transmitting the location of the UE across a cellular network to an emergency monitoring node; and
based on the obtained primary location data and the determined supplemental location information, transmitting the location of the UE across a packet data network to the emergency monitoring node.

16. The one or more computer storage devices of claim 15, wherein the emergency monitoring node comprises a public safety answering points (PSAP) and/or a gateway mobile location center (GMLC).

17. The one or more computer storage devices of claim 15, wherein the operations further comprise:
receiving, at the emergency monitoring node, the location of the UE from the cellular network;
receiving, at the emergency monitoring node, the location of the UE from the packet data network;
comparing the location of the UE received from the cellular network with the location of the UE received from the packet data network; and
based on at least the location of the UE received from the cellular network differing from the location of the UE received from the packet data network, generating an alert.

18. The one or more computer storage devices of claim 15, wherein the operations further comprise:
during the emergency call, iteratively:
  determining the location of the UE; and
  based on at least a time interval, transmitting the location of the UE across the packet data network to the emergency monitoring node.

19. The one or more computer storage devices of claim 15, wherein the operations further comprise:

based on at least detecting the emergency call originating from the UE, transmitting device identification information across the packet data network to the emergency monitoring node, wherein the device information comprises a data item selected from the list consisting of:

an operating system (OS) identification, a model identification of the UE, and a source identification of the UE.

\* \* \* \* \*